(12) United States Patent
Gallotto et al.

(10) Patent No.: US 12,129,590 B2
(45) Date of Patent: Oct. 29, 2024

(54) LAUNDRY WASHING MACHINE WITH IMPROVED WASHING PERFORMANCES

(71) Applicant: Electrolux Appliances Aktiebolag, Stockholm (SE)

(72) Inventors: Vittorio Gallotto, Porcia (IT); Maurizio Del Pos, Pordenone (IT); Andrea Contarini, Sacile (IT); Marco Spada, Porcia (IT); Angelo Le Pera, Porcia (IT)

(73) Assignee: Electrolux Applicances Aktiebolag, Stockholm (SE)

( * ) Notice: Subject to any disclaimer, the term of this patent is extended or adjusted under 35 U.S.C. 154(b) by 0 days.

(21) Appl. No.: 17/777,121

(22) PCT Filed: Nov. 18, 2019

(86) PCT No.: PCT/EP2019/081666
§ 371 (c)(1),
(2) Date: May 16, 2022

(87) PCT Pub. No.: WO2021/098943
PCT Pub. Date: May 27, 2021

(65) Prior Publication Data
US 2022/0396908 A1      Dec. 15, 2022

(51) Int. Cl.
*D06F 39/02*      (2006.01)
*D06F 23/02*      (2006.01)
(Continued)

(52) U.S. Cl.
CPC ............ *D06F 39/024* (2013.01); *D06F 23/02* (2013.01); *D06F 33/37* (2020.02); *D06F 34/10* (2020.02);
(Continued)

(58) Field of Classification Search
CPC .... D06F 39/024; D06F 37/065; D06F 37/145; D06F 33/37; D06F 33/57; D06F 2105/42; D06F 17/06; D06F 17/08; D06F 17/10
See application file for complete search history.

(56) References Cited

U.S. PATENT DOCUMENTS

| | | | |
|---|---|---|---|
| 1,902,193 A | * | 3/1933 | Stoddard ................. D06F 17/06 |
| | | | 68/23.5 |
| 3,878,721 A | | 4/1975 | Nath |

(Continued)

FOREIGN PATENT DOCUMENTS

| | | |
|---|---|---|
| CN | 101079569 A | 11/2007 |
| CN | 101153456 A | 4/2008 |

(Continued)

OTHER PUBLICATIONS

Chinese Office Action for Chinese Application No. 201880093598.X, dated Sep. 5, 2022 with translation, 19 pages.

(Continued)

*Primary Examiner* — David G Cormier
(74) *Attorney, Agent, or Firm* — Bradley Arant Boult Cummings LLP

(57) ABSTRACT

A laundry washing machine having a cabinet, a washing tub housed inside the cabinet, a drum rotatably housed inside the cabinet, an electric additive treating device mounted in/on the drum and configured for treating a washing and/or rinsing additive loaded within the drum in such a way to generate within the drum a solution of washing and/or rinsing additive water. A method for operating such a laundry washing machine is also provided.

17 Claims, 10 Drawing Sheets

(51) Int. Cl.
*D06F 33/37* (2020.01)
*D06F 34/10* (2020.01)
*D06F 37/04* (2006.01)
*D06F 37/06* (2006.01)
*D06F 39/08* (2006.01)
*H02J 50/12* (2016.01)
*H02J 50/40* (2016.01)

(52) U.S. Cl.
CPC ............ *D06F 37/04* (2013.01); *D06F 37/065* (2013.01); *D06F 39/028* (2013.01); *D06F 39/085* (2013.01); *H02J 50/12* (2016.02); *H02J 50/40* (2016.02)

(56) References Cited

U.S. PATENT DOCUMENTS

| | | |
|---|---|---|
| 5,318,705 A | 6/1994 | Pellerin |
| 5,813,253 A | 9/1998 | Uhlin |
| 8,336,338 B2 | 12/2012 | Cimetta et al. |
| 9,347,165 B2 | 5/2016 | Kim et al. |
| 9,951,465 B1 | 4/2018 | Herschler et al. |
| 11,168,430 B2 | 11/2021 | Park et al. |
| 2003/0061842 A1 | 4/2003 | Ryu et al. |
| 2004/0118168 A1 | 6/2004 | Woo et al. |
| 2004/0134094 A1 | 7/2004 | Hahn et al. |
| 2005/0097926 A1 | 5/2005 | Kim et al. |
| 2005/0210603 A1* | 9/2005 | Houser .............. D06F 37/24 68/23.1 |
| 2006/0081018 A1 | 4/2006 | Kim |
| 2007/0113595 A1* | 5/2007 | Harwood ............ D06F 39/087 68/12.01 |
| 2008/0053166 A1 | 3/2008 | Lim |
| 2008/0317688 A1 | 12/2008 | Doyle et al. |
| 2011/0154678 A1 | 6/2011 | Lee |
| 2011/0162224 A1 | 7/2011 | Bae et al. |
| 2012/0192362 A1 | 8/2012 | Lee et al. |
| 2013/0314897 A1 | 11/2013 | Dal Ben et al. |
| 2014/0355247 A1 | 12/2014 | Ius et al. |
| 2014/0366589 A1 | 12/2014 | Park et al. |
| 2015/0225887 A1 | 8/2015 | Schulze |
| 2016/0330572 A1 | 11/2016 | Kropp et al. |
| 2017/0096760 A1 | 4/2017 | Borlin et al. |
| 2018/0266030 A1 | 9/2018 | Kwon et al. |
| 2020/0263343 A1 | 8/2020 | Liu et al. |

FOREIGN PATENT DOCUMENTS

| | | |
|---|---|---|
| CN | 201047684 Y | 4/2008 |
| CN | 101400842 A | 4/2009 |
| CN | 201325442 Y | 10/2009 |
| CN | 103261506 A | 8/2013 |
| CN | 104131438 A | 11/2014 |
| CN | 104781462 A | 7/2015 |
| CN | 106245279 A | 12/2016 |
| CN | 106835621 A | 6/2017 |
| CN | 107541888 A | 1/2018 |
| CN | 107541905 A | 1/2018 |
| CN | 207121735 | 3/2018 |
| CN | 207812118 U | 9/2018 |
| CN | 109737073 A | 5/2019 |
| CN | 110318220 A | 10/2019 |
| DE | 4104450 A1 | 8/1992 |
| EP | 0351671 A1 | 1/1990 |
| EP | 0503999 A1 | 9/1992 |
| EP | 1167609 A1 | 1/2002 |
| EP | 2270272 A1 | 1/2011 |
| EP | 2302125 A1 | 3/2011 |
| EP | 2604740 A1 | 6/2013 |
| EP | 2719818 A1 | 4/2014 |
| EP | 2955263 A1 | 12/2015 |
| EP | 2990519 A1 | 3/2016 |
| EP | 3378982 A1 | 9/2018 |
| EP | 3388569 A1 | 10/2018 |
| EP | 3441512 A1 | 2/2019 |
| EP | 3594402 A1 | 1/2020 |
| FR | 2695657 A1 | 3/1994 |
| JP | 0433689 A | 2/1992 |
| JP | 2005021505 A | 1/2005 |
| JP | 2005177331 A | 7/2005 |
| JP | 2007159892 A | 6/2007 |
| JP | 2017127402 A | 7/2017 |
| KR | 100798779 B1 | 1/2008 |
| KR | 20130114482 A | 10/2013 |
| WO | 9000641 A1 | 1/1990 |
| WO | 2007063368 A1 | 6/2007 |
| WO | 2009061325 A1 | 5/2009 |
| WO | 2013022164 A2 | 2/2013 |
| WO | 2016182540 A1 | 11/2016 |
| WO | 2018045955 A1 | 3/2018 |
| WO | 2018091717 A1 | 5/2018 |
| WO | 2018184734 A1 | 10/2018 |
| WO | 2018236155 A1 | 12/2018 |
| WO | 2019223849 A1 | 11/2019 |
| WO | 2019223850 A1 | 11/2019 |

OTHER PUBLICATIONS

Korean Request for the Submission of an Opinion for Korean Application No. 10-20207032957, dated Sep. 17, 2022 with translation, 12 pages.
International Search Report and Written Opinion for International Application No. PCT/EP2020/053358, dated May 11, 2020, 9 pages.
International Search Report and Written Opinion for International Application No. PCT/EP2017/079819, dated Feb. 23, 2018—9 pages.
International Search Report and Written Opinion for International Application No. PCT/EP2018/063258, dated Feb. 4, 2019, 10 pages.
International Search Report and Written Opinion for International Application No. PCT/EP2020/025278, dated Sep. 30, 2020, 15 pages.
International Search Report and Written Opinion for International Application No. PCT/EP2018/063259, dated Feb. 5, 2019, 10 pages.
Chinese Office Action with Search Report for Chinese Application No. 201980103036.3, dated May 18, 2023 with translation, 21 pages.
English Translation of Chinese Office Action with Search Report for Chinese Application No. 202080052935.8, dated May 24, 2023, 14 pages.
International Search Report and Written Opinion for International Application No. PCT/EP2019/081666, dated Feb. 13, 2020, 11 pages.
International Search Report and Written Opinion for International Application No. PCT/EP2019/081667, dated Feb. 5, 2020, 10 pages.
International Search Report and Written Opinion for International Application No. PCT/EP2019/081664, dated Feb. 5, 2020, 10 pages.
Chinese Office Action with Search Report for Chinese Application No. 201980102232.9, dated Apr. 26, 2023 with translation, 28 pages.
Chinese Office Action with Search Report for Chinese Application No. 201980102188.1, dated Apr. 26, 2023 with translation, 24 pages.
Korean Request for the Submission of an Opinion for Korean Application No. 10-2020-7033385, dated Mar. 30, 2023 with translation, 19 pages.
Non Final Office Action for U.S. Appl. No. 17/777,124, mailed Sep. 22, 2023, 19 pages.
Chinese Office Action dated Jan. 6, 2024 of Chinese Patent Application No. 201980102232.9.

(56) References Cited

OTHER PUBLICATIONS

Chinese Office Action with Search Report for Chinese Application No. 201880093070.2, dated Aug. 31, 2023 with translation, 21 pages.

* cited by examiner

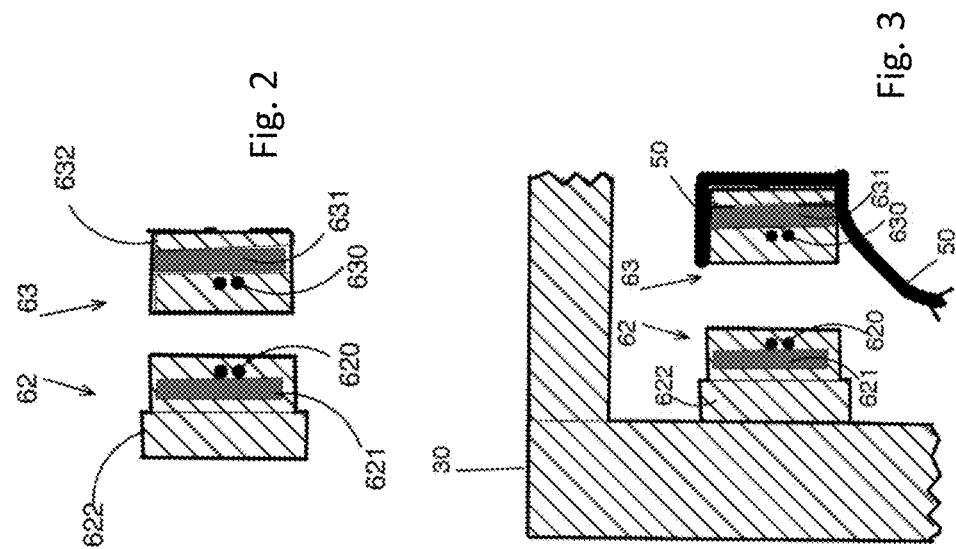
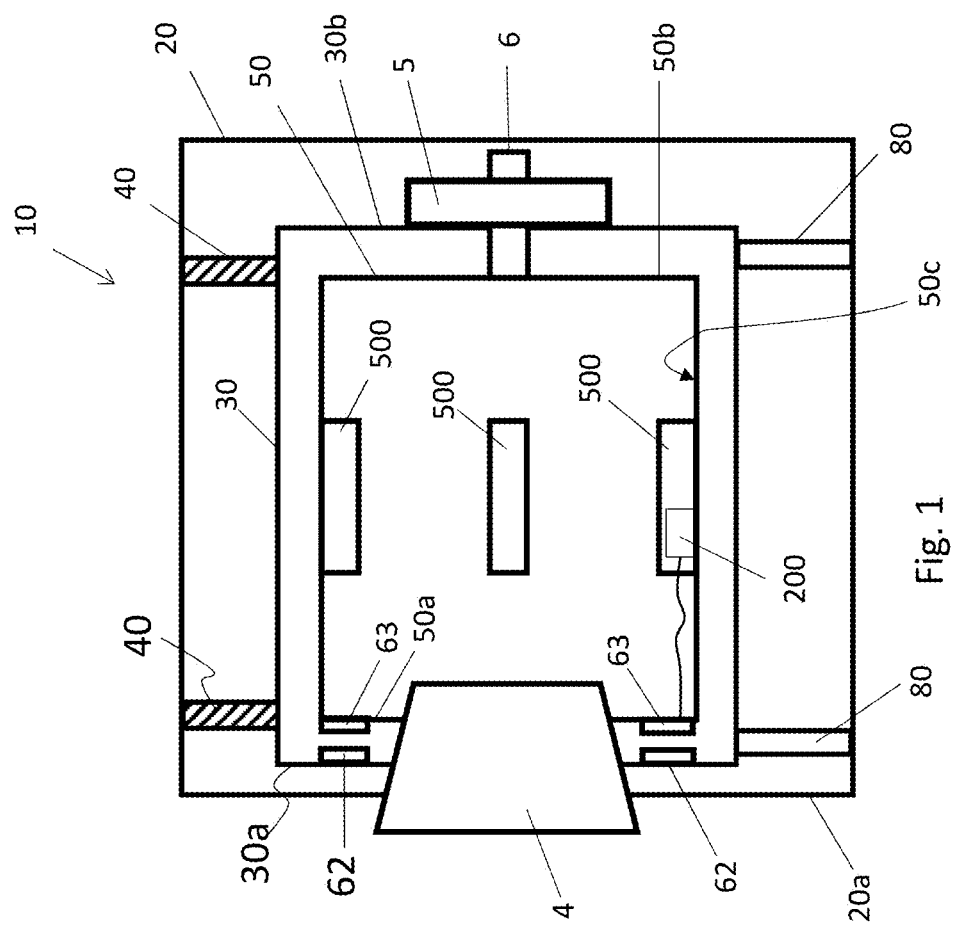

LAUNDRY WASHING MACHINE WITH IMPROVED WASHING PERFORMANCES

This application is a U.S. National Phase application of PCT International Application No. PCT/EP2019/081666, filed Nov. 18, 2019, which is incorporated by reference herein.

The present invention refers to a laundry washing machine with improved washing performances.

BACKGROUND

Nowadays washing machines, both "simple" washing machines (i.e. washing machines which can only wash and rinse the laundry) and washing-drying machines (or "washer-driers", i.e. washing machines which can also dry the laundry), usually comprise an external casing, typically called cabinet, provided with a loading/unloading door which allows the access to a washing tub containing a rotary perforated drum in which the laundry to be washed (or also dried, in case of a washer-drier) can be loaded.

Usually the drum is provided with one or more lifters (called also elevators, or ribs, or diverter), adapted to improve the stirring of the laundry during the rotation of the drum; the lifters are substantially prismatic elements protruding from the inner face of the lateral surface of the drum and positioned with their longitudinal axis substantially parallel to the rotation axis of the drum.

Water and washing and/or rinsing additives (i.e. detersives, softeners, bleaching, etc.) are supplied to the washing tub, and therefore to the drum contained in the latter, by a liquid supply circuit connectable to water delivery mains present outside the machine; after the washing or rinsing phases, washing/rinsing liquid (i.e. water or water mixed with a washing and/or rinsing additive(s)) is discharged from the tub by a discharge circuit.

The liquid supply circuit of known laundry washing machines typically comprises an additive housing, associated to the cabinet, containing a removable drawer provided with a plurality of compartments adapted to be filled with washing and/or rinsing additives; water, coming from water mains to which the liquid supply circuit is connected, is selectively taken into one or more of the compartments of the drawer (e.g. by controlling suitable electromagnetic inlet valve(s)), so as to contact and mix with the additive(s) contained therein.

The washing/rinsing solution (i.e. water and washing and/or rinsing additive(s)) is then taken to the washing tub by a conduit fluidly connecting the additive housing and the washing tub.

In some known laundry washing machines, the conduit takes the washing/rinsing solution to the bottom of the tub, where it is collected until reaching a certain level at which it can enter the drum via the perforated surface of the latter.

In some known laundry washing machines, the conduit sprays the washing/rinsing solution against the perforated lateral surface of the drum, from which the washing/rinsing solution enters the latter.

In some known laundry washing machines, in particular of the so-called "front loading" type, in which the cylindrical drum (rotatable about an horizontal or slightly inclined axis) and the cylindrical tub are opened, for loading/unloading the laundry, at their frontal base, the outlet of the conduit is positioned close to the loading/unloading opening of the tub, and it is arranged in such a way to spray the washing/rinsing solution directly within the loading/unloading opening of the drum, so as to directly reach the laundry contained therein.

Some known washing machines are also provided with a recirculation circuit adapted to draw the washing/rinsing liquid from the bottom of the tub and to re-admit this re-circulated washing/rinsing liquid into an upper region of the tub.

Above mentioned known solutions have however some drawbacks.

First of all, in known solutions there is the risk that the washing/rinsing liquid does not effectively reach all the laundry contained in the drum.

For example, in the known solutions in which the washing/rinsing liquid enters the drum through its perforated walls, the latter obstruct the path of the washing/rinsing liquid towards the laundry contained in the drum, and there is the risk that not all the laundry is effectively wetted by the liquid, in particular the part of the laundry positioned in the central part of the drum.

In the solutions in which the washing/rinsing liquid is sprayed directly towards the loading/unloading opening of the drum, the laundry positioned close to the loading/unloading opening obstructs the path of the washing/rinsing liquid towards the part of the laundry positioned in the inner and in the rear part of the drum.

A further drawback of above cited known solutions is that, since the washing/rinsing solution is produced in the additive housing, and then taken to the laundry via a conduit (and in some known solution, as mentioned above, also collected in the bottom of the tub at a level high enough for entering the drum through its perforated walls), the amount of washing/rinsing liquid must be relatively high, since it must fill the conduit, and optionally also the bottom of the tub; this causes a high consumption of water and washing/rinsing additive.

In addition, since the washing/rinsing additive(s) is(are) mixed to the water in the additive housing, which is quite far away from the laundry, there is risk that the washing/rinsing additive(s) could lose part of its(their) washing/rinsing effect before reaching the laundry, which worsens the washing/rinsing performances, or requires using a relative high amount of additive(s) for obtaining a good washing/rinsing effect.

In addition, the additive housing and its water feeding circuit is relatively complex and bulky, and it takes up, within the cabinet of the washing machine, a relative high space which could otherwise be used for increasing the load capacity of the machine.

SUMMARY

The aim of the present invention is therefore to provide a laundry washing machine which does not present above mentioned problems, and which allows treating all or at least most of the laundry contained in the drum with a washing and/or rinsing additive in an effective way, reducing at the same time the water and washing/rinsing additive consumption with respect to the prior art.

Within this aim, a further object of the invention is obtaining a laundry washing machine in which, with respect to above cited prior art solutions, the external dimensions could be reduced for a same load capacity, or, vice versa, the load capacity could be increased for the same external dimensions.

Another object of the present invention is obtaining a laundry washing machine in which, with respect to above cited prior art solutions, the consumption of water and washing/rinsing solution for obtaining the same washing/rinsing performances is reduced.

A further object of the present invention is obtaining a laundry washing machine which is reliable and which is few subjected to wear and tear.

Applicant has found that, by providing a laundry washing machine comprising an electric additive treating device mounted in/on its drum and configured for treating a washing and/or rinsing additive loaded within the drum in such a way to generate within the drum a solution of washing and/or rinsing additive and water, it is possible generating the solution of water and washing and/or rinsing additive directly within the drum, and therefore exactly where the laundry is positioned; in this way the risk that some laundry is not effectively treated with the solution is very low.

In addition, the possibility of generating the solution of water and washing and/or rinsing additive directly within the drum allows reducing the usage of water and washing/rinsing additives, since it is no more necessary filling conduits external to the drum with the solution, neither collecting the solution in the bottom of the tub at a level high enough for entering the drum.

The possibility of generating the solution directly within the drum reduces the risk that the washing/rinsing effect of the washing/rinsing additive contained in such a solution is reduced before reaching the laundry.

The possibility of generating the solution within the drum starting form an additive loaded directly within the latter, allows avoiding to provide an additive housing associated to the casing, which provides more free space within the cabinet of the washing machine; this additional space could be used, for example, for increasing the load capacity of the machine.

In an advantageous embodiment, the electric additive treating device is electrically powered by a wireless power receiver unit mounted in/on the drum, and to which the electric power is wireless transmitted by a power transmitter unit associated to the cabinet and/or to the tub, separately from the drum; in this way it is possible avoiding sliding contacts (and the related wear and tear problems) for transmitting electric power between a not-rotating part of the washing machine (the cabinet or the washing tub) and the drum, and therefore the reliability of the washing machine is improved.

In particular, above aim is solved by a laundry washing machine comprising: a cabinet, a washing tub housed inside the cabinet, a drum rotatably housed inside the tub, a device mounted in/on the drum and configured for treating a washing and/or rinsing additive loaded within the drum in such a way to generate within the drum a solution of washing and/or rinsing additive and water.

In a preferred embodiment, the electric additive treating device comprises an additive container housed within the drum and adapted to be filled with a washing and/or rinsing additive, and an electric apparatus is configured for causing and/or enhancing the mixing of water with the washing and/or rinsing additive.

In an advantageous embodiment, the electric apparatus comprises an inlet pump configured for pumping water within the additive container, in such a way that this water contacts and mix with a washing and/or rinsing additive when the latter is contained in the additive container.

Preferably, the inlet pump is configured for drawing water contained in the washing tub and pumping this water within the additive container.

In a further preferred embodiment, the inlet pump is configured for drawing water from a water reservoir mounted in/on the drum and pumping this water within the additive container.

In a further advantageous embodiment, the electric apparatus comprises an outlet pump configured for pumping a solution of water and washing and/or rinsing additive from the internal of the additive container to the external of the latter.

In an advantageous embodiment, the additive container comprises one or more perforated inlet walls through which a liquid can enter the additive container so as to contact a washing and/or rinsing additive when the latter is contained in the additive container.

More preferably, the additive container comprises one or more perforated outlet walls by which a solution of water and washing and/or rinsing additive can exit the additive container.

In an advantageous embodiment, one or more perforated inlet walls and one or more perforated outlet walls coincide, totally or partially.

In an advantageous embodiment, the electric apparatus comprises an electric mixer configured for improving the mixing of water and washing and/or rinsing additive contained in the additive container.

In an advantageous embodiment, the electric apparatus comprises an additive pump configured for drawing a washing and/or rinsing additive out of the additive container, and pumping it in a region of the laundry washing machine where it can contact and mix with water.

In an advantageous embodiment, the additive container is configured for containing a washing and/or rinsing additive pod, and the apparatus comprises an electric perforating device configured for piercing the additive pod in such a way that washing and/or rinsing additive contained therein leaks out and can mix with water contained in the additive container.

In a preferred embodiment, the electric perforating device comprises an electric actuator configured for selectively moving a piercing element towards an additive pod contained in the additive container, until piercing the additive pod.

In a further advantageous embodiment, the electric perforating device comprises an electric water jet generator configured for selectively generating a water jet impinging on an additive pod contained in the additive container, in such a way to pierce the additive pod.

Preferably, the laundry washing machine comprises at least one lifter, hollow, protruding from the lateral internal surface of the drum, towards the internal of the latter, wherein the electric additive treating device is at last partially contained within the lifter, or it comprises the lifter or a portion thereof.

More preferably, the additive container is at last partially housed within the lifter.

Even more preferably, the additive container is totally housed within the lifter.

In a further advantageous embodiment, the additive container coincides with the lifter or with a portion thereof.

Preferably, the electric apparatus is at last partially housed within the lifter.

More preferably, the electric apparatus is totally housed within the lifter.

Advantageously, the lifter comprises a lid or door allowing the access to the electric additive treating device or to a portion thereof.

In an advantageous embodiment, the additive pump is configured for drawing a washing and/or rinsing additive out of the additive container and pumping it within the lifter.

In an advantageous embodiment, the additive pump is configured for drawing a washing and/or rinsing additive out of the additive container and pumping it outside the lifter.

Advantageously the laundry washing machine comprises a wireless power transmitter unit associated to the cabinet and/or to the washing tub separately from the drum, and arranged for wireless transmitting electric power to a wireless power receiver unit mounted in/on the drum, wherein the wireless power receiver unit is configured for supplying electric power to the electric additive treating device.

Preferably, the wireless power receiver unit is arranged for supplying electric power to the electric apparatus.

Preferably, the electric additive treating device is wired connected to the wireless power receiver unit.

Preferably, the wireless power transmitter unit is electrically connected to an electrical system of the laundry washing machine.

Preferably, the wireless power transmitter unit is wired electrically connected to the electrical system of the laundry washing machine.

Advantageously, the wireless power transmitter unit is mounted in/on the washing tub.

Advantageously, the power transmitter unit and the power receiver unit are positioned, one opposite to the other, fixed respectively to the washing tub and to the drum, parallel one another, and to a plane perpendicular to the rotation axis of the drum.

Preferably, the wireless power transmitter unit comprises a transmission coil generating a magnetic field and the wireless power receiver unit comprises a reception coil generating power from the magnetic field generated by the transmission coil and supplying the generated power to the electric additive treating device.

Advantageously, the transmission coil and the reception coil are aligned, centered and parallel one another, and to a plane perpendicular to the rotation axis of the drum.

Advantageously, the transmission coil and the reception coil have a common radius dimension approximately equal to the drum external radius and are distanced in axial direction by a distance lower than their radius.

Preferably, the transmission coil and the reception coil are distanced in axial direction by a distance lower than 10 cm.

More preferably, the transmission coil and the reception coil are distanced in axial direction by a distance lower than 5 cm.

In an advantageous embodiment, the wireless power receiver unit comprises a receiver magnetic shielding member, and the wireless power transmitter unit comprises a transmission magnetic shielding member.

Preferably, the receiver magnetic shielding member is positioned between the reception coil and the drum side, and the transmission magnetic shielding member is positioned between the transmission coil and the washing tub side.

Preferably, the receiver magnetic shielding member is positioned on the opposite side of the reception coil with respect to the wireless power transmitter unit.

Preferably, the transmission magnetic shielding member is positioned on the opposite side of the transmission coil with respect to the wireless power receiver unit.

In a preferred embodiment, the washing and/or rinsing additive is or comprises a fabric detergent and/or a fabric softener.

In an advantageous embodiment, the laundry washing machine comprises a control unit managing operations of the laundry washing machine, and the electric apparatus is controlled by the control unit, to which it is operative connected.

Preferably, the electric apparatus is operatively connected to the control unit by a data transmission system.

Preferably, the electric apparatus is controlled by a dedicated control system mounted in/on the drum.

Preferably, the dedicated control system is operatively connected to and controlled by the control unit.

In an advantageous embodiment, a suction side of the inlet pump is fluidly connected by a suction pipe to the internal of the tub, and the control unit is configured for activating the inlet pump when the angular position of the drum is such that the suction pipe is in contact with water contained in the tub.

In an advantageous embodiment, a suction side of the inlet pump is fluidly connected by a suction pipe to the internal of the tub, and the dedicated control system is configured for activating the inlet pump when the angular position of the drum is such that the suction pipe is in contact with water contained in the tub.

In an advantageous embodiment, the additive container is manually and/or automatic refillable.

In further advantageous embodiments, the electric apparatus comprises an electric pushing system, associated to the additive container, and configured for pushing washing and/or rinsing additive out of the additive container, so as to take it in a region of the laundry washing machine where it can contact and mix with water.

Preferably, the electric pushing system can comprise a cylinder-piston system, in which the piston is configured for moving within the additive container in such a way to reduce its internal volume and pushing out washing and/or rinsing additive contained therein.

Preferably, the electric pushing system is controlled by the control unit, to which it is operative connected, for example by a wireless data transmission system.

In a further advantageous embodiment, the electric pushing system comprises a dedicated control system mounted in/on the drum.

In advantageous embodiments, the wireless power receiver unit is configured for supplying electric power to the electric pushing system.

Preferably, the electric pushing system is wired connected to the wireless power receiver unit.

Preferably, the reservoir from which the inlet pump is draws water is housed, partially or totally, within the lifter.

In an advantageous embodiment, the additive pump is configured for pumping a washing and/or rinsing additive, drawn out of the additive container, to the external of the lifter, and within the drum.

In a further advantageous embodiment, the additive pump is configured for pumping a washing and/or rinsing additive, drawn out of the additive container, to the internal of the lifter, and the walls of the latter are perforated, so that water can enter the lifter and mix with the washing and/or rinsing additive drawn out of the additive container by the additive pump, and the solution that is generated can exit the lifter and go directly to the internal of the drum.

Above aim is also solved by a method for operating a laundry washing machine comprising a cabinet, a washing tub housed inside the cabinet, a drum rotatably housed inside the tub, an electric additive treating device mounted in/on the drum and configured for treating a washing and/or rinsing additive loaded within the drum in such a way to generate within the drum a solution of washing and/or rinsing additive and water; the method comprises the following steps:

loading a washing and/or rinsing additive within the drum;

loading laundry within the drum;

activating the electric additive treating device for causing the mix of washing and/or rinsing additive with water and generating the solution within the drum;

providing the solution to the laundry loaded within the drum.

In a preferred embodiment, in which the laundry washing machine comprises a wireless power transmitter unit associated to the cabinet and/or to the washing tub separately from the drum, and arranged for wireless transmitting electric power to a wireless power receiver unit mounted in/on the drum, and the wireless power receiver unit is configured for supplying electric power to the electric additive treating device, the method comprises the following steps:

wireless supplying electric power from the wireless power transmitter unit to the wireless power receiver unit;

supplying electric power from the wireless power receiver unit to the electric additive treating device, so that the latter can be activated.

BRIEF DESCRIPTION OF THE DRAWINGS

Other advantages and features of a laundry washing machine according to the present invention will be clear from the following detailed description, provided only as a not limitative example, in which:

FIG. 1 is a sectional view of a possible embodiment of a laundry washing machine according to the invention.

FIG. 2 is a sectional view of a detail of a possible embodiment of a wireless transmitter power unit and a wireless receiver power unit of a laundry washing machine according to the invention.

FIG. 3 is a sectional view showing more in detail an advantageous embodiment of the fixation of the wireless power transmitter unit to the tub and the wireless power receiver unit to the drum of a laundry washing machine according to the invention.

In the figures same parts are indicated with the same reference numbers.

DETAILED DESCRIPTION OF EXEMPLARY EMBODIMENTS

Figure 5:
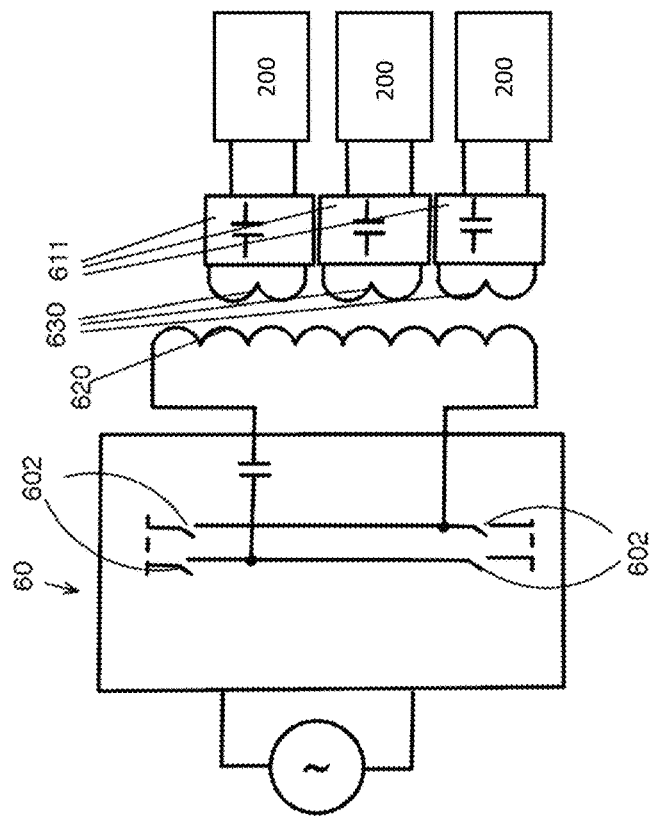
FIG. 5 is block diagram of another embodiment of a power supply circuit of the electric additive treating device(s) of a laundry washing machine according to the invention.

An advantageous embodiment of a laundry washing machine 10 according to the invention is schematically illustrated in FIG. 1; in this advantageous embodiment, the washing machines is a "simple" washing machine (i.e. a washing machine which can only wash and rinse the laundry); anyway, it is clear that the invention can be applied, without any substantial modification, also to washer-driers.

Advantageously the laundry washing machine 10 illustrated in FIG. 1 is of the front-loading type; it is however clear that the invention can be applied, without any substantial modification, also to top-loading washing machines.

The laundry washing machine 10 according to the invention advantageously comprises a cabinet 20 in which frontal wall 20a an access opening is preferably obtained, preferably connected to the cabinet 20 via a flexible bellows, not illustrated.

Preferably, a loading/unloading door 4 allows the access to a washing tub 30, advantageously suspended to the cabinet 20 through springs 40 and dampers 80.

The washing tub 30 advantageously contains a rotary perforated drum 50 in which the laundry to be washed, not illustrated, can be loaded.

The drum 50 is preferably provided with a rotating shaft 6, protruding from its rear wall 50b, and preferably supported by one or more bearings, not illustrated, preferably provided in the rear wall 30b of the tub 30; the shaft 6, and therefore the drum 50, is preferably rotated by an electric motor 5, preferably, but not necessarily, fixed directly to the rear wall 30b of the tub 30, or connected to the shaft 6 by a belt-pulley assembly, not illustrated.

Advantageously, as in the examples illustrated in attached Figures, the laundry washing machine 10 comprises at least one lifter 500 (called also elevator, or rib, or diverter), hollow, protruding from the lateral internal surface 50c of the drum 50, towards the internal of the latter, adapted to improve the stirring of the laundry during the rotation of the drum 50; the lifter 500 is, preferably, a substantially prismatic element, advantageously positioned with its longitudinal axis substantially parallel to the rotation axis of the drum 50.

The laundry washing machine 10 preferably comprises a water inlet circuit, not illustrated, adapted to feed water into the tub 30; the water inlet circuit can advantageously comprise a water pipe, a first end of which is preferably connected or connectable to the water mains of a building (also not illustrated), and a second end of which is preferably arranged in such a way to take water coming from its first end to internal of the washing tub 30, more preferably to the bottom or the latter.

Preferably, the water inlet circuit comprises an electrovalve, not illustrated, configured for selectively allowing or preventing the passage of water from the first end to the second end of the water pipe; preferably, the electro-valve can be controlled by a control unit 60 of the laundry washing machine 10.

The control unit 60 preferably manages the operations of the laundry washing machine 10, for example by controlling the drum motor rotation speed as well as the other valves and/or actuators comprised in the laundry treating apparatus, for example a drain pump and a user interface (not illustrated).

In a further advantageous embodiment, also not illustrated, the water inlet circuit can be part of a liquid supply circuit of the known type, provided in the laundry washing machine 10.

The liquid supply circuit of a washing machine is well known in the art, and therefore will not be described in detail.

The laundry washing machine 10 is also advantageously provided with a drain circuit, also not illustrated, adapted for draining washing/rinsing liquid from the machine.

The drain circuit of a washing machine is well known in the art, and therefore will not be described in detail.

A wireless power transmitter unit 62 is preferably associated to the cabinet 20 and/or to the washing tub 30, separately from the drum 50; in the advantageous embodiment illustrated in FIG. 1, the wireless power transmitter unit 62 is advantageously fixed to the tub 30, preferably to the internal wall of the tub 30 facing the drum 50.

In a different advantageous embodiment, the wireless power transmitter unit 62 can be mounted, for example, in a static or fixed part of the cabinet 20.

The laundry washing machine 10 is also preferably provided with a wireless power receiver unit 63, mounted in/on the drum 50.

The wireless power transmitter unit 62 is arranged for wireless transmitting electric power to the wireless power receiver unit 63.

The wireless power transmitter unit 62 is electrically connected, preferably wired, to the electric system, not illustrated, of the laundry washing machine 10; the electric system is connectable, for example, to the electric mains, not illustrated, of the building where the laundry washing machine 10 is installed, so as to be power supplied by such electric mains.

In advantageous embodiments, like for example the one illustrated in FIG. 1, the wireless power transmitter unit 62 and the wireless power receiver unit 63 are positioned, one opposite to the other, fixed respectively to the washing tub 30 and to the drum 50, and preferably parallel one another, and to a plane perpendicular to the rotation axis of the drum 50.

In advantageous embodiments, like for example the one illustrated in FIG. 1, the wireless power receiver unit 63 is fixed to a front wall 50a of the drum 50, advantageously corresponding to its opening side, and the wireless power transmitter unit 62 is preferably fixed to the front wall 30a of the tub 30, facing the wireless power receiver unit 63.

In another advantageous embodiment, not illustrated, the wireless power transmitter unit 62 can be fixed to the rear wall 30b of the tub 30, preferably facing the drum 50, and the wireless power receiver unit 63 can be fixed to the rear wall 50b of the drum 50, facing the tub 30.

The wireless power receiver unit 63 is electromagnetically coupled to the wireless power transmitter unit 62.

Preferably, the wireless power transmitter unit 62 and the wireless power receiver unit 63 are annular shaped (e.g. they are or comprise electrically conductive coils); more preferably, they are centered with the drum 50 center, and mounted parallel one another, and to a plane perpendicular to the rotation axis of the drum 50, respectively on the tub 30 and on the drum 50.

The power receiver unit 63 is advantageously fixed opposite the power transmitter unit 62, and parallel to the latter and to a plane perpendicular to the rotation axis of the drum 50.

In FIG. 2 a sectional view of a preferred embodiment of the wireless power transmitter unit 62 and wireless power receiver unit 63 is schematically shown.

The wireless power transmitter unit 62 has preferably a transmission coil 620 which is electromagnetically coupled to a reception coil 630 of the wireless power receiver unit 63. They are preferably integrated into an enclosing material 622, 632 and they have, preferably, respectively magnetic sheets 621 and 631 that provide the side magnetic shield to the sides external to the coupling area, and improve the magnetic coupling between the two coils 620 and 630.

Preferably, the wireless power transmitter unit 62 and the wireless power receiver unit 63 are parallel, centered with respect to the drum 50 center in order to maximize the electromagnetic coupling, as shown for example in FIG. 3.

In the advantageous example of FIG. 3, the wireless power receiver unit 63 could be advantageously fixed in an annular opening formed in the drum 50 external periphery, while the power transmitter unit could advantageously have its side 622 fixed with screw or glued to the tub 30 wall.

According to the invention, the laundry washing machine 10 comprises one or more electric additive treating device 200, mounted in/on the drum, that will be better described in the following.

In advantageous embodiments, like the ones illustrated in attached Figures, the wireless power receiver unit 63 is configured for supplying electric power to the electric additive treating device(s) 200.

In advantageous embodiments, like the ones illustrated in attached Figures, the electric additive treating device 200 is wired connected to the wireless power receiver unit 63.

Figure 4:
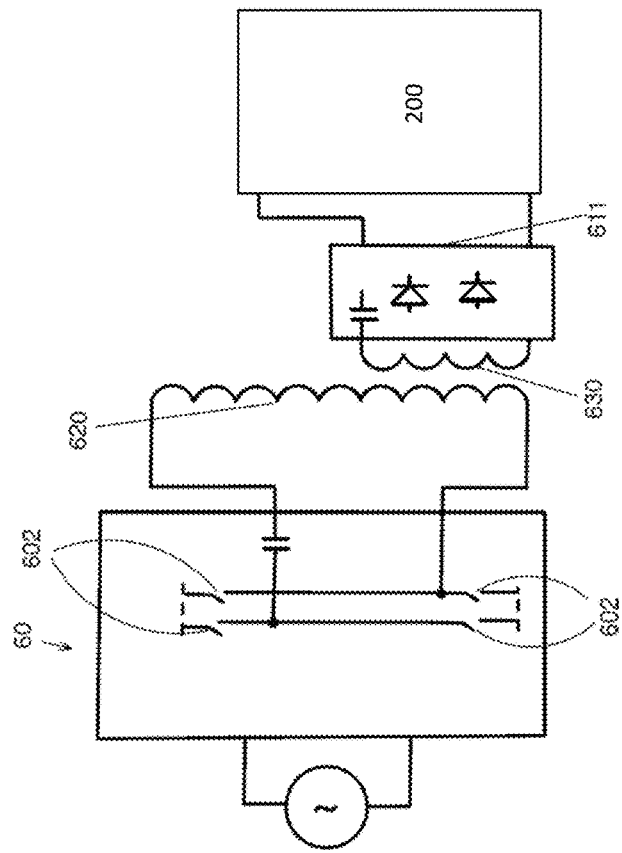
FIG. 4 is a block diagram of a first embodiment of a power supply circuit of the electric additive treating device(s) of a laundry washing machine according to the invention.

As shown for example in the advantageous embodiment of FIG. 4, in the control unit 60 of the laundry washing machine 10, an oscillating voltage can be generated by switching elements 602, that are electrically connected to the transmission coil 620 of the wireless power transmitter unit 62 coupled to the reception coil 630 of the wireless power receiver unit 63. The voltage induced in the coil 630 can be preferably rectified and conditioned in a coil interface block 611, and can be preferably brought, preferably by wires, to one more electric additive treating device 200 (if they are more than one, they can be preferably, but not necessarily, electrically connected one another in parallel), only schematically illustrated in FIG. 4, mounted in/on the drum 50.

Preferably, the components of the interface block 611 could be integrated in the power receiver unit 63.

In a further advantageous embodiment, for example the one shown in FIG. 5, the power receiver unit 63 has multiple coils 630, each coil 630 preferably supplying, through its own interface block 611, one or more respective electric additive treating device 200.

Figure 6:
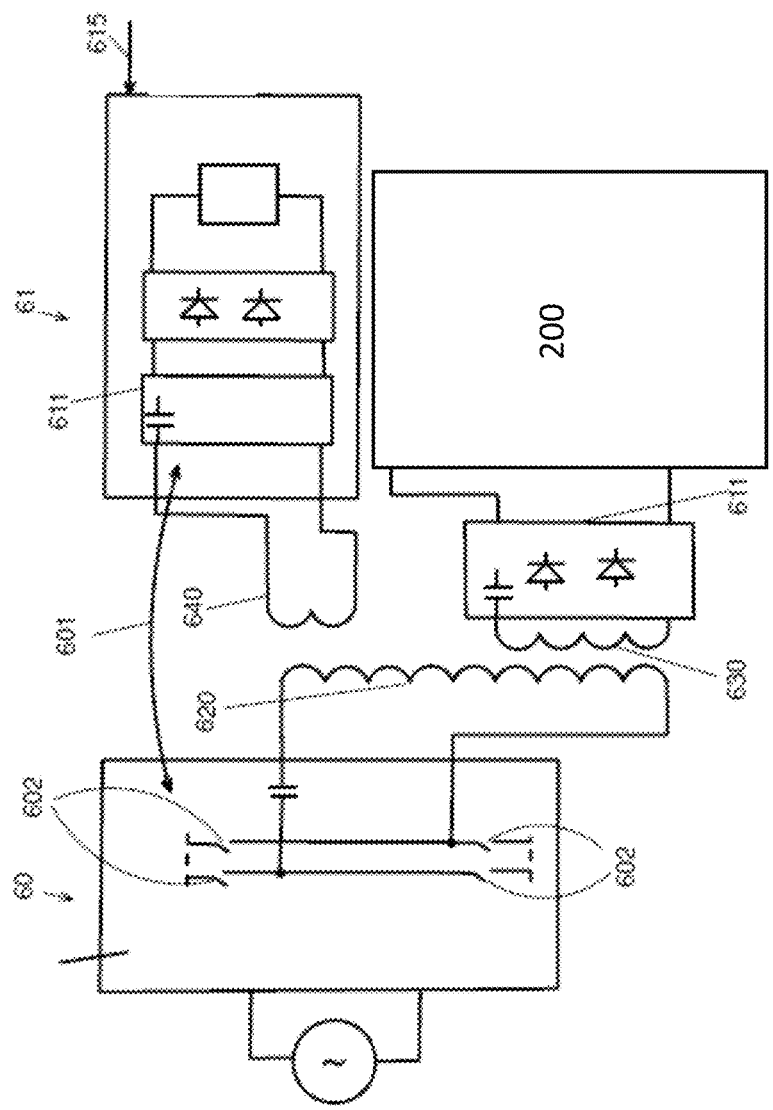
FIG. 6 is block diagram of another embodiment of a power supply circuit of an electric additive treating device of a laundry washing machine according to the invention, including an interface unit.

A further advantageous embodiment is shown in FIG. 6. In this embodiment, on the drum 50 there is fixed an interface unit 61, together with the power receiver unit 63 and the one or more electric additive treating device 200. The interface unit 61 can be supplied by a dedicated reception coil 640 of the receiver unit 63, as shown in FIG. 6, or it could be connected in parallel to the reception coil 630 supplying the electric additive treating device(s) 200.

The interface unit 61 has preferably a wireless connection 601 to transfer measurement data to the appliance control unit 60.

For example, the interface unit 61 could transfer to the appliance control unit 60 measured temperatures 615 from temperature measurement elements, not illustrated, positioned, for example, in the lifters 500; this would allow, for example, configuring washing cycles based on the real temperature measured in the drum 50, and not extrapolated by the temperature measured in the tub 30 that at the beginning of the cycle can be very different.

The interface unit 61 could be for example positioned integrated in the isolating support material 632 of the power receiver unit 63, or it could be positioned, for example, on the drum 50 rear wall 50b, preferably in a central region of the latter. The biggest advantage of this position is that the interface unit 61 components are not subject to the high centrifugal forces.

In a further advantageous embodiment, not illustrated, the electric power can be supplied to the electric additive treating device(s) 200 by a sliding electric contact, not illustrated, configured for electrically connecting the electric additive treating device(s) 200, mounted in/on the drum 50, to a power supply device, not illustrated, mounted on a not-rotating part of the laundry washing machine 10 (e.g. the tub 30 or the cabinet 20), preferably electrically connectable to the electric mains of a building.

In the following, different possible advantageous embodiments of electric additive treating devices 200 according to the invention will be described.

In general, an electric additive treating device 200 is an electric device (i.e. a device which is power supplied with electric energy) which is configured for treating washing and/or rinsing additive(s) (for example a laundry detergent, a laundry softener, bleach, etc.) in such a way to generate a solution of washing and/or rinsing additive(s) and water.

It is underlined that in this application the expression "treating an additive" has to be understood as performing on such an additive an action that has the effect of causing it to mix with water and to generate a solution with the latter; for example, "treating the additive" could mean "spraying water on the additive", or "pouring the additive into a reservoir containing water or against a water flow", or "extracting the additive from a close container in such a way that it can come into contact with the water", etc.

In a preferred embodiment, the electric additive treating device 200 comprises an additive container 7 housed within the drum 50 and adapted to be filled with a washing and/or rinsing additive 8, for example a laundry detergent, a laundry softener, etc.

The additive container 7 is preferably refillable, manually (for example by opening a suitable lid 77) and/or automatically (for example by a suitable refilling system, not illustrated).

Preferably, the electric additive treating device 200 comprises an electric apparatus configured for causing and/or enhancing the mixing of water with said washing and/or rinsing additive.

Preferably, the electric apparatus is controlled by the control unit 60, to which it is operative connected, for example by a wireless data transmission system, not illustrated.

Figure 7:
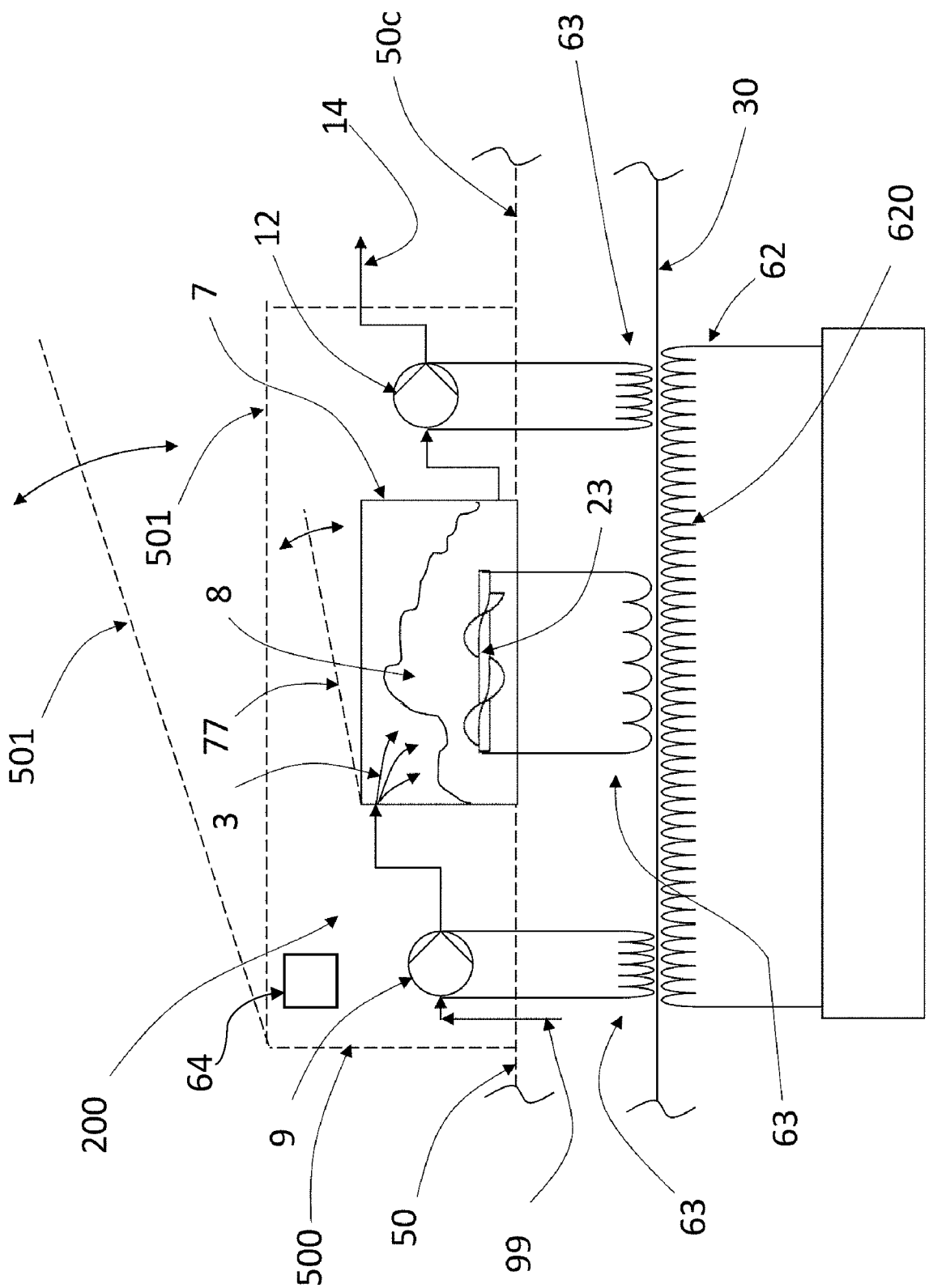
FIG. 7 is a schematic view of a first embodiment of an electric additive treating device of a laundry washing machine according to the invention.

In a further advantageous embodiment, the electric apparatus comprises a dedicated control system 64, illustrated in FIG. 7, mounted in/on the drum 50.

Preferably, but not necessarily, the dedicated control system 64 is operatively connected to and controlled by the control unit 60 of the laundry washing machine 10.

In advantageous embodiments, like the ones illustrated in attached Figures, the wireless power receiver unit 63 is configured for supplying electric power to the electric apparatus of the electric additive treating device 200.

Figure 8:
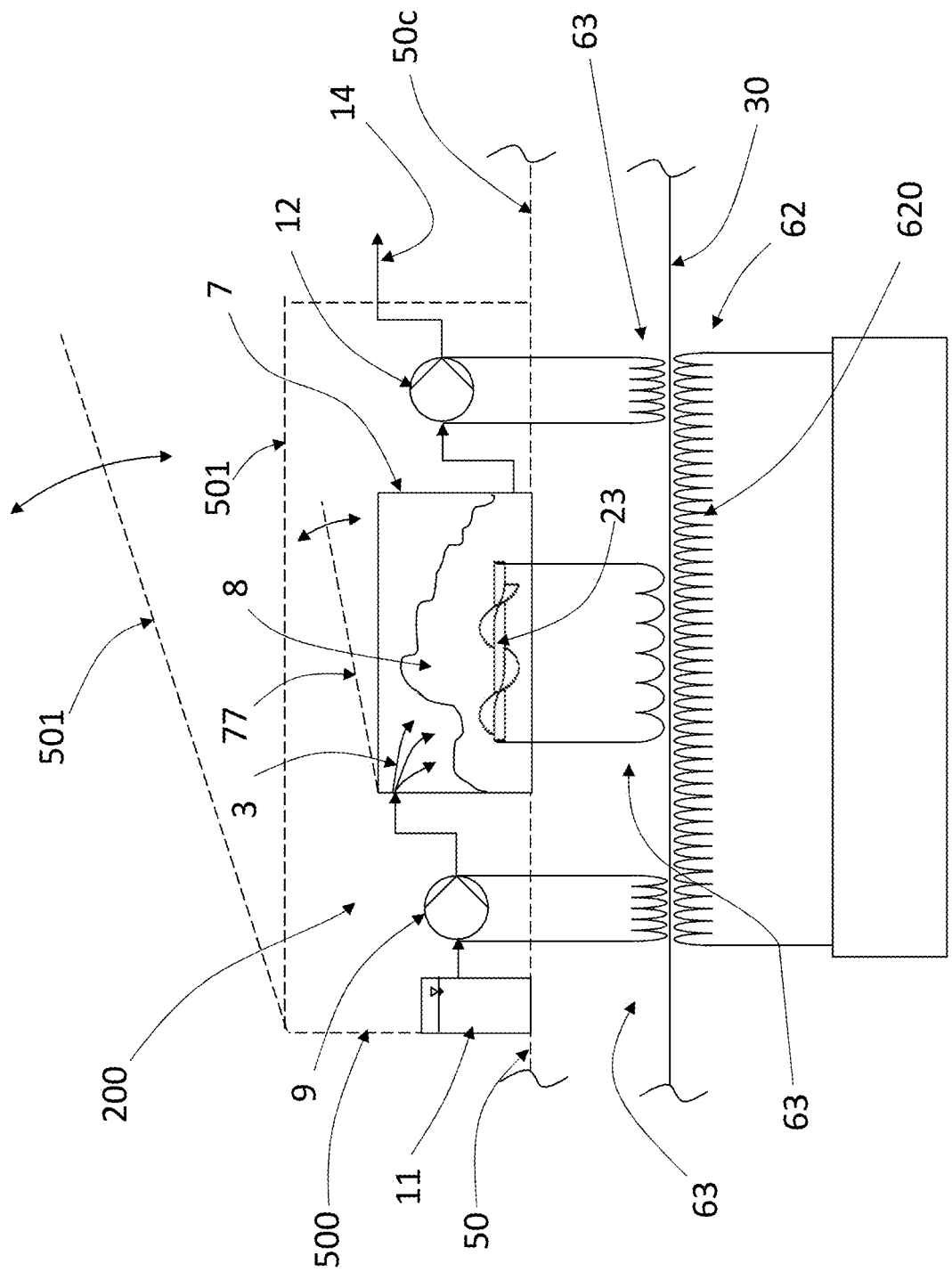
FIG. 8 is a schematic view of a second embodiment of an electric additive treating device of a laundry washing machine according to the invention.

In advantageous embodiments, like the ones illustrated for example in FIG. 7 and FIG. 8, the electric apparatus advantageously comprises an inlet pump 9 configured for pumping water 3 within the additive container 7, in such a way that this water 3 contacts and mix with a washing and/or rinsing additive 8 when the latter is contained in the additive container 7.

Preferably, the inlet pump 9 is controlled by the control unit 60, to which it is operative connected, for example by a wireless data transmission system.

In a further advantageous embodiment, the inlet pump 9 comprises a dedicated control system, not illustrated, mounted in/on the drum 50.

In advantageous embodiments, like for example the ones illustrated in FIGS. 7 and 8, the wireless power receiver unit 63 is configured for supplying electric power to the inlet pump 9.

In advantageous embodiments, like for example the ones illustrated in FIGS. 7 and 8, the inlet pump 9 is wired connected to the wireless power receiver unit 63.

In advantageous embodiments, like for example the ones illustrated in FIG. 7 and FIG. 8, the discharge side of the inlet pump 9 is advantageously fluidly connected to the internal of the additive container 7, so as to pump water 3 within the latter, and in particular within a region of the latter in which a washing and/or rinsing additive 8 can be placed.

In an advantageous embodiment, like for example the one illustrated in FIG. 7, the inlet pump 9 is advantageously configured for drawing water contained in the washing tub 30, and for pumping this water 3 within the additive container 7; in this case, the suction side of the inlet pump 9 is fluidly connected, for example by a suitable suction pipe 99, to the external of the drum 50, and in particular to the internal of the tub 30, in such a way to be able to draw water contained in the latter. In this case, preferably, the control unit 60 (and/or the dedicated control system 64, if present) can be configured for activating the inlet pump 9 when the angular position of the drum 50 is such that the suction pipe is in contact with the water contained in the tub 30.

In a further advantageous embodiment, as the one illustrated for example in FIG. 8, the inlet pump 9 is preferably configured for drawing water from a water reservoir 11 mounted in/on the drum 50, and for pumping this water 3 within the additive container 7.

Advantageously, the water reservoir 11 can be manually and/or automatically refillable; in an advantageous embodiment, the water reservoir 11 can draw water from the internal of the tub 30, for example during the rotation of the drum 50, or when the drum 50 is in a specific angular position.

In advantageous embodiments, like for example the ones illustrated in FIGS. 7 and 8, the electric apparatus comprises an outlet pump 12 configured for pumping a solution 14 of water 3 and washing and/or rinsing additive 8 from the internal of the additive container 7 to the external of the latter, so that such solution 14 can contact the laundry contained in the drum 50.

Preferably, the outlet pump 12 is controlled by the control unit 60, to which it is operative connected, for example by a wireless data transmission system.

In a further advantageous embodiment, the outlet pump 12 comprises a dedicated control system, not illustrated, mounted in/on the drum 50.

In advantageous embodiments, like for example the ones illustrated in FIGS. 7 and 8, the wireless power receiver unit 63 is configured for supplying electric power to the outlet pump 12.

In advantageous embodiments, like for example the ones illustrated in FIGS. 7 and 8, the outlet pump 12 is wired connected to the wireless power receiver unit 63.

In advantageous embodiments, like for example the ones illustrated in FIGS. 7 and 8, the electric apparatus comprises an electric mixer 23 configured for improving the mixing of water 3 and washing and/or rinsing additive 8 contained in the additive container 7.

The electric mixer 23 can comprise, for example, an auger, or screw or spiral mixed, mounted within the additive container 7, in such a way to stir a washing/rinsing additive 8 contained therein.

Preferably, the electric mixer 23 is controlled by the control unit 60, to which it is operative connected, for example by a wireless data transmission system.

In a further advantageous embodiment, the electric mixer 23 comprises a dedicated control system, not illustrated, mounted in/on the drum 50.

In advantageous embodiments, like for example the ones illustrated in FIGS. 7 and 8, the wireless power receiver unit 63 is configured for supplying electric power to the electric mixer 23.

In advantageous embodiments, like for example the ones illustrated in FIGS. 7 and 8, the electric mixer 23 is wired connected to the wireless power receiver unit 63.

In further advantageous embodiments, like for example the ones illustrated in FIGS. 9 and 10, the electric apparatus comprises an additive pump 13 configured for drawing a washing and/or rinsing additive 8 out of the additive container 7, and, as it will be better explained in the following, pumping it in a region of the laundry washing machine 10 where it can contact and mix with water; in this case, preferably, the washing and/or rinsing additive 8 contained in the additive container 7 is a liquid or a gel.

Preferably, the additive pump 13 is controlled by the control unit 60, to which it is operative connected, for example by a wireless data transmission system.

In a further advantageous embodiment, the additive pump 13 comprises a dedicated control system, not illustrated, mounted in/on the drum 50.

Figure 9:
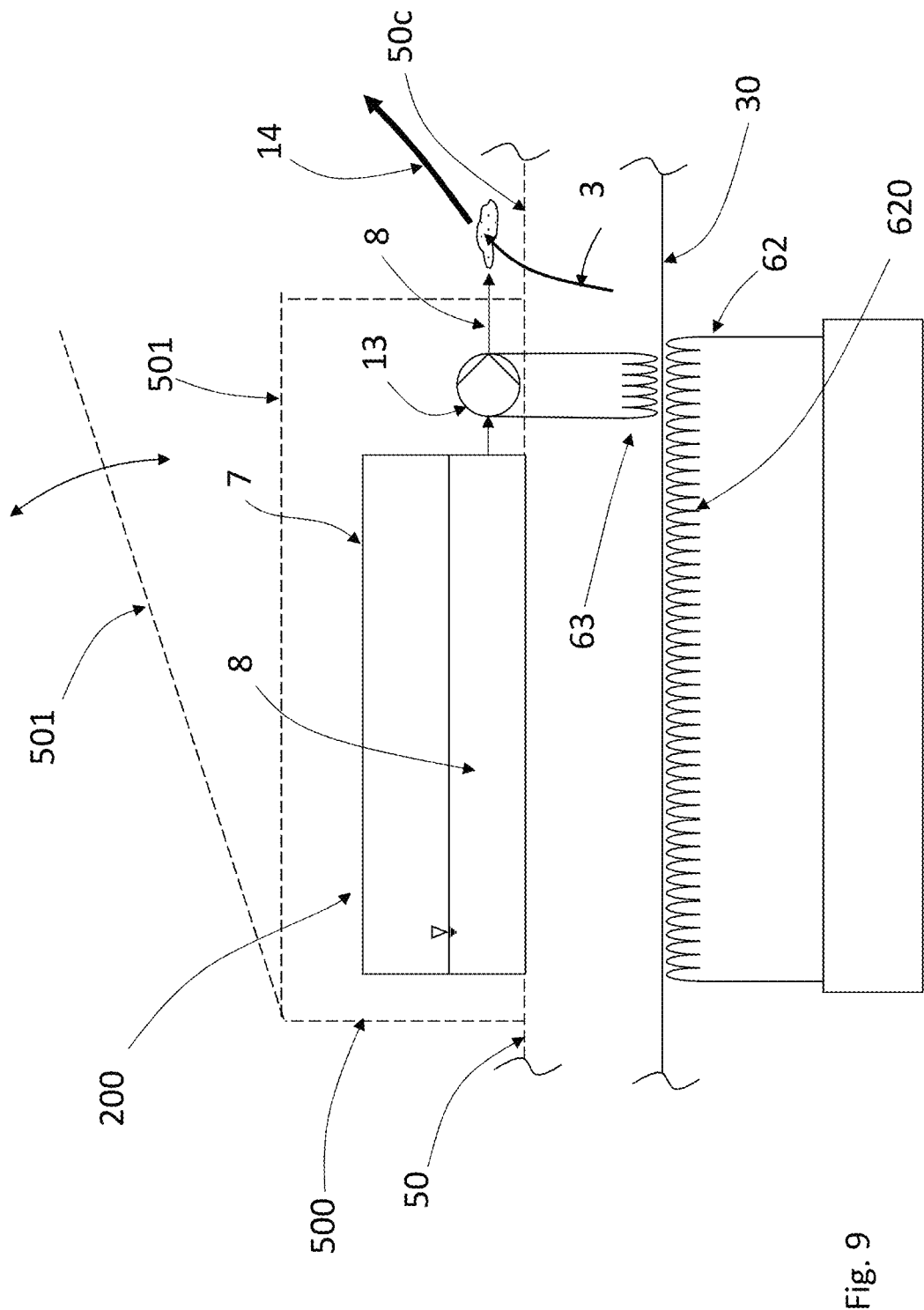
FIG. 9 is a schematic view of a further embodiment of an electric additive treating device of a laundry washing machine according to the invention.
Figure 10:
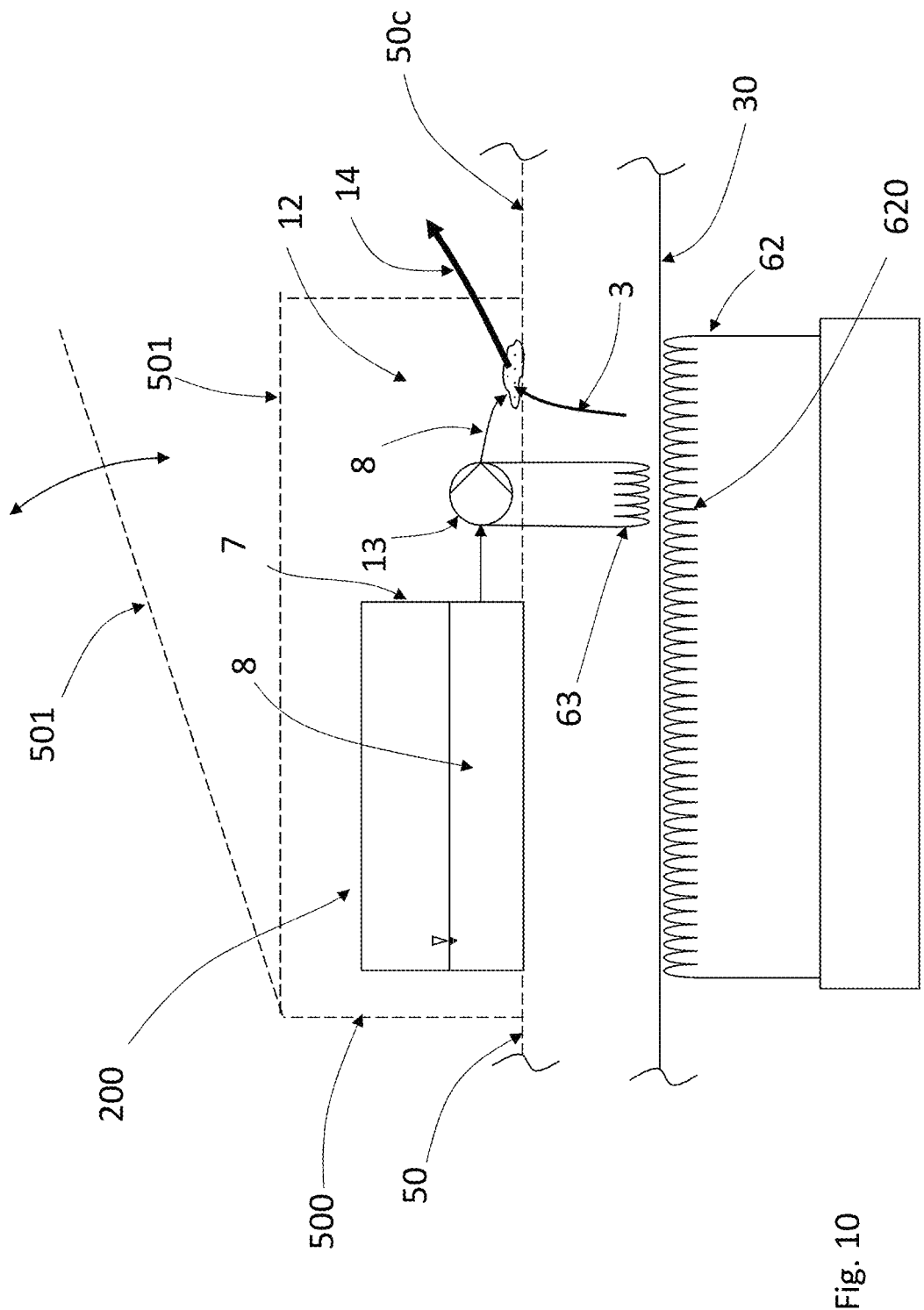
FIG. 10 is a schematic view of a further embodiment of an electric additive treating device of a laundry washing machine according to the invention.

In advantageous embodiments, like for example the ones illustrated in FIGS. 9 and 10, the wireless power receiver unit 63 is configured for supplying electric power to the additive pump 13.

In advantageous embodiments, like for example the ones illustrated in FIGS. 9 and 10, the additive pump 13 is wired connected to the wireless power receiver unit 63.

In further advantageous embodiments, not illustrated, the electric apparatus can comprise an electric pushing system, associated to the additive container 7, and configured for pushing washing and/or rinsing additive 8 out of the additive container 7, so as to take it in a region of the laundry washing machine 10 where it can contact and mix with water; for example, this electric pushing system can comprise a cylinder-piston system, in which the piston is configured for moving within the additive container 7 in such a way to reduce its internal volume and pushing out washing and/or rinsing additive 8 (which in this case is a liquid or a gel) contained therein. Preferably, the electric pushing system is controlled by the control unit 60, to which it is operative connected, for example by a wireless data transmission system.

In a further advantageous embodiment, the electric pushing system comprises a dedicated control system, not illustrated, mounted in/on the drum 50.

In advantageous embodiments, not illustrated, the wireless power receiver unit 63 is configured for supplying electric power to the electric pushing system.

In advantageous embodiments, not illustrated, the electric pushing system is wired connected to the wireless power receiver unit 63.

In advantageous embodiments, like the ones illustrated in FIGS. 7 to 10, the electric additive treating device 200 is advantageously at last partially contained within a lifter 500 of the laundry washing machine 10.

In advantageous embodiments, like for example the ones illustrated in attached Figures, the lifter 500 comprises a lid or door 501 allowing the access to the electric additive treating device 200 or to a portion thereof.

In a preferred embodiment, the additive container 7 is at last partially housed within a lifter 500.

More preferably, like in the examples illustrated in FIGS. 7 to 10, the additive container 7 is totally housed within a lifter 500.

In an advantageous embodiment, like the one illustrated in FIG. 8, the water reservoir 11 is housed, preferably totally housed, within a lifter 500, more preferably within the same lifter 500 in which the additive container 7 is housed.

In an advantageous embodiment, like the ones illustrated in attached Figures, the electric apparatus is at last partially housed within a lifter 500.

In an advantageous embodiment, the electric apparatus is totally housed within a lifter 500.

For example, in the advantageous embodiments illustrated in FIGS. 7 and 8, the inlet pump 9 and the outlet pump 12 are totally housed within a lifter 500.

In the advantageous embodiments illustrated in FIGS. 9 and 10, the additive pump 13 is advantageously totally housed within a lifter 500.

In an advantageous embodiment, like the one illustrated in FIG. 7, the suction pipe 99 is connected to the inlet pump 9 within a lifter 500, and its inlet is positioned outside the lifter 500, and outside the drum 50, so as to be able to draw water contained in the tub 30.

In advantageous embodiments, like the ones illustrated in FIGS. 7 and 8, the outlet pump 12 is configured for pumping a solution 14 of water 3 and washing and/or rinsing additive 8 from the internal of the additive container 7 to the external of the lifter 500 wherein it is contained, and in particular to the internal of the drum 50, so that such solution 14 can contact the laundry contained in the drum 50.

In an advantageous embodiment, like the one illustrated in FIG. 9, the additive pump 13 is configured for pumping a washing and/or rinsing additive 8, drawn out of the additive container 7, to the external of the lifter 500, and within the drum 50, so that this washing and/or rinsing additive 8 can contact the water 3 entering the drum 50 through its perforated lateral surface 50c, and mix with such water 3 for generating a solution 14 of water 3 and washing and/or rinsing additive 8.

In a further advantageous embodiment, like the one illustrated in FIG. 10, the additive pump 13 is configured for pumping a washing and/or rinsing additive 8, drawn out of the additive container 7, to the internal of the lifter 500, and more preferably the walls of the latter are perforated, so that water 3 can enter the lifter 500 and mix with the washing and/or rinsing additive 8 drawn out of the additive container 7 by the additive pump 13, and the solution 14 that is generated can exit the lifter 500 and go directly to the internal of the drum 50.

In advantageous embodiments, like for example the ones illustrated in FIGS. 11 to 14, the additive container 7 comprises one or more perforated inlet walls 15 through which a liquid 3 can enter the additive container 7 so as to contact a washing and/or rinsing additive 8 when the latter is contained in the additive container 7.

In advantageous embodiments, like for example the ones illustrated in FIGS. 11 to 14, the additive container 7 comprises one or more perforated outlet walls 16 through which a solution 14 of water 3 and washing and/or rinsing additive 8 can exit the additive container 7.

In an advantageous embodiment, the perforated inlet walls 15 and the perforated outlet walls 16 coincide, totally or partially.

In advantageous embodiments, like the ones illustrated in FIGS. 11 to 14, the electric additive treating device 200 advantageously comprises a lifter 500 or a portion thereof.

In advantageous embodiments, the additive container 7 coincides with a lifter 500 or with a portion thereof; for example, in the advantageous embodiments of FIGS. 11 to 14, the lifter 500 is configured for housing a washing and/or rinsing additive, and therefore it is an additive container 7 according to the invention.

In advantageous embodiments, like for example the ones illustrated in FIGS. 11 to 14, the additive container 7 is configured for containing a washing and/or rinsing additive pod 17, which is, generally, a, preferably water-soluble, pouch containing highly concentrated laundry detergent, softener and other laundry products.

In this advantageous case, the electric apparatus can advantageously be or comprise an electric perforating device configured for piercing the additive pod 17 in such a way that washing and/or rinsing additive 3 contained therein leaks out and can mix with water contained in the additive container 7.

It is highlighted that in this case the expression "piercing the additive pod 17" include any operation having the effect of producing a hole, or anyhow opening the pod 17, so that the additive contained therein can come out.

Figure 12:
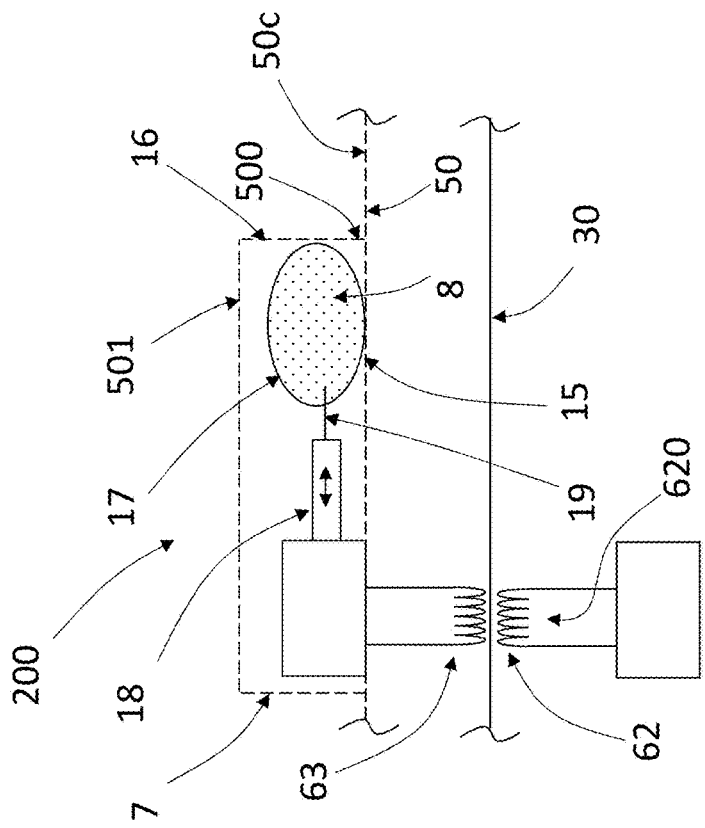
FIGS. 11 to 13 are schematic views of a further embodiment of an electric additive treating device of a laundry washing machine according to the invention, in three operative conditions.
Figure 11:
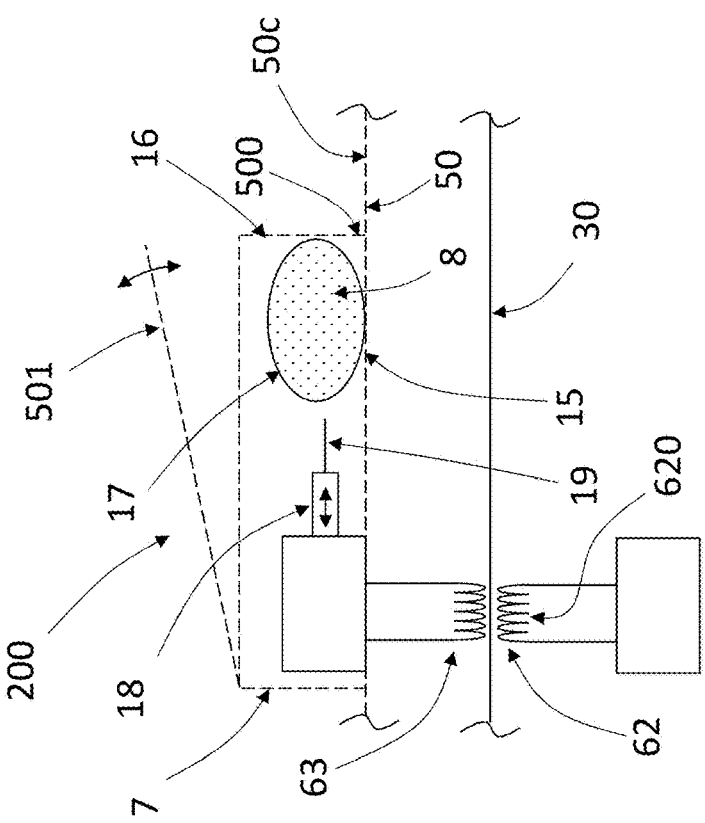
Figure 13:
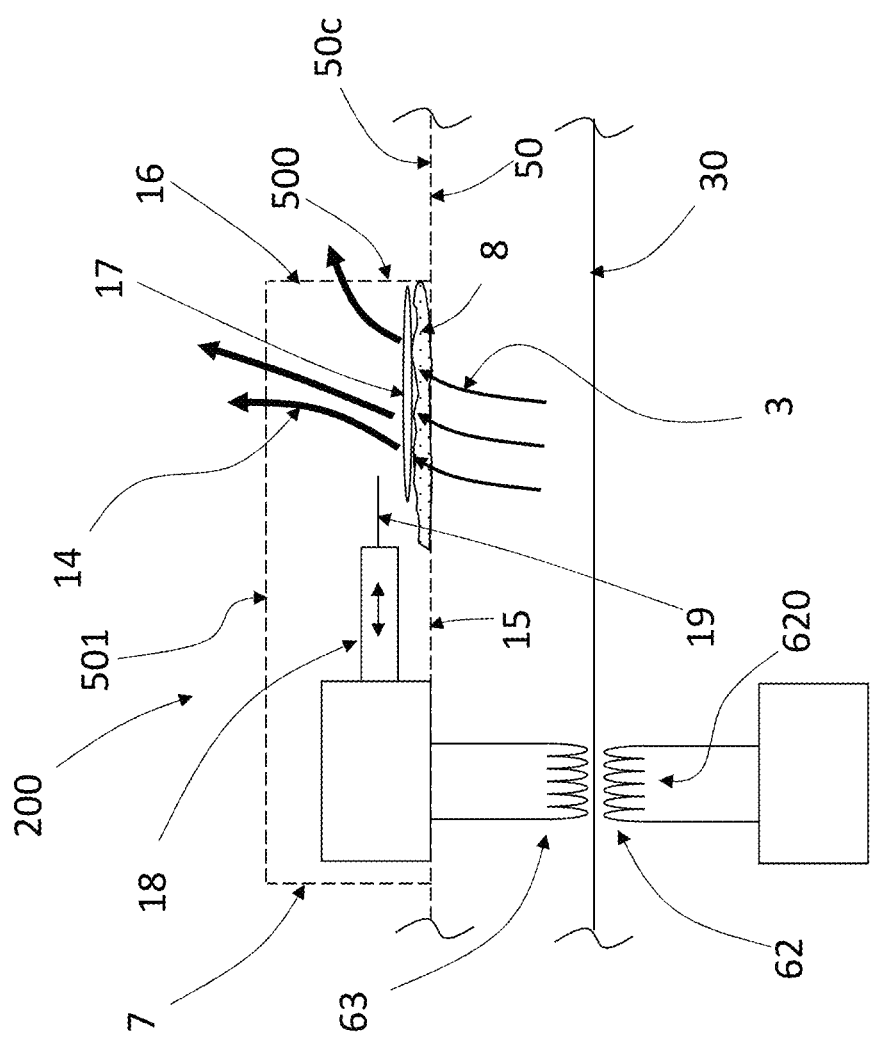

In an advantageous embodiment, like for example the one illustrated in FIGS. 11 to 13, the electric perforating device comprises an electric actuator 18 configured for selectively moving a piercing element 19 towards an additive pod 17 contained in the additive container 7, until piercing this additive pod 17.

Preferably, the electric actuator 18 is controlled by the control unit 60, to which it is operative connected, for example by a wireless data transmission system.

In a further advantageous embodiment, the electric actuator 18 comprises a dedicated control system, not illustrated, mounted in/on the drum 50.

In advantageous embodiments, like for example the ones illustrated in FIGS. 11 to 13, the wireless power receiver unit 63 is configured for supplying electric power to the electric actuator 18.

In advantageous embodiments, like for example the ones illustrated in FIGS. 7 and 8, the electric actuator 18 is wired connected to the wireless power receiver unit 63.

In an advantageous embodiment, like for example the one illustrated in FIGS. 11 to 13, the electric actuator 18 and the piercing element 19 are housed within the lifter 500 containing the pod 17.

Figure 14:
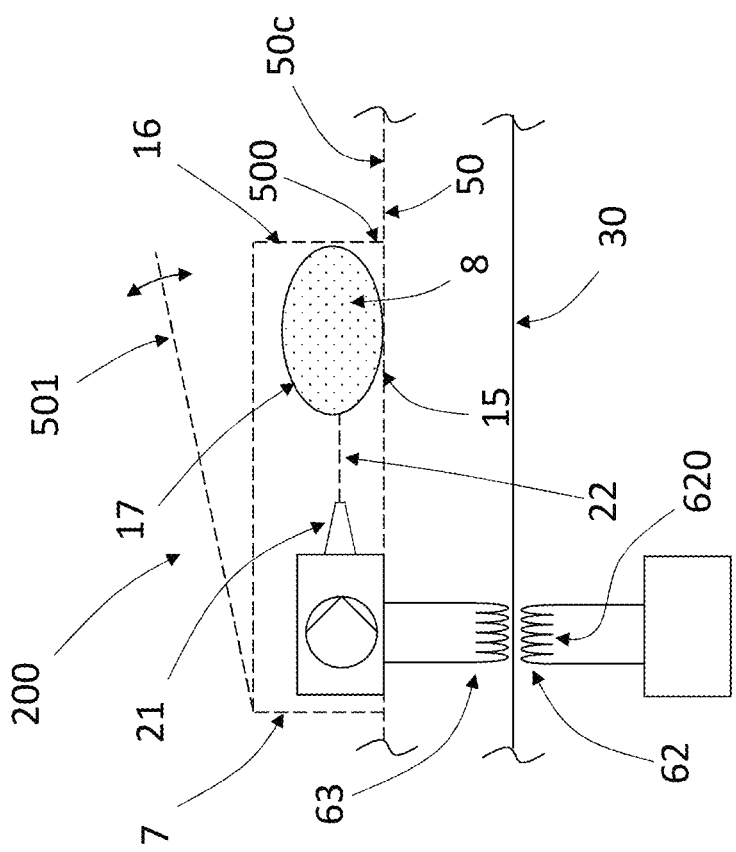
FIG. 14 is a schematic view of a further embodiment of an electric additive treating device of a laundry washing machine according to the invention.

In a further advantageous embodiment, for example the one illustrated in FIG. 14, the electric perforating device comprises an electric water jet generator 21 configured for selectively generating a water jet 22 impinging on an additive pod 17 contained in the additive container 7, in such a way to pierce said additive pod 17.

Advantageously, the electric water jet generator 21 can take water for producing the water jet 22 from the tub 30, and/or from a dedicated reservoir, not illustrated, for example mounted in/on the drum 50, optionally manually and/or automatically refillable.

Preferably, the electric water jet generator 21 is controlled by the control unit 60, to which it is operative connected, for example by a wireless data transmission system.

In a further advantageous embodiment, the electric water jet generator 21 comprises a dedicated control system, not illustrated, mounted in/on the drum 50.

In advantageous embodiments, like for example the one illustrated in FIG. 14, the wireless power receiver unit 63 is configured for supplying electric power to the water jet generator 21.

In advantageous embodiments, like for example the one illustrated in FIG. 14, the water jet generator 21 is wired connected to the wireless power receiver unit 63.

In an advantageous embodiment, like for example the one illustrated in FIG. 14, the water jet generator 21 is housed within the lifter 500 containing the pod 17.

The functioning of the laundry washing machine 10 according to the invention will be described in the following only in relation to the functioning of the electric additive treating device(s) 200.

With reference to the embodiment illustrated in FIG. 7, after a washing and/or rinsing additive 8 has been loaded in the additive container 7, the laundry can be loaded in the drum 50.

During a washing or rinsing process, clean water can be loaded in the washing tub 30; after taking the drum 50 (if needed) in an angular position in which the suction pipe 99 is in contact with the water contained in the tub 30, the inlet pump 9 can be activated, so as to draw such water 3 and take it into the additive container 7, where it contacts and mixes with the washing and/or rinsing additive 8 contained therein, producing a solution 14.

The electric mixer 23, if present, can be activated for improving the mixing of water 3 and washing and/or rinsing additive 8.

Then the outlet pump 12 can be activated, for pumping a solution 14 of water 3 and washing and/or rinsing additive 8 from the internal of the additive container 7 to the external of the latter, and in particular to the internal of the drum 50, where the laundry is positioned.

In this way, such solution 14 directly contacts the laundry contained in the drum 50, effectively wetting the latter, and ensuring an optimal washing and/or rinsing effect.

The functioning of the embodiment illustrated in FIG. 8 differs from the one of FIG. 7 only because in the embodiment of FIG. 8 the inlet pump 9 draws water 3 from a water reservoir 11 mounted in/on the drum 50, and not from the bottom of the tub 30.

With reference to the embodiment of FIG. 9, after a washing and/or rinsing additive 8 has been loaded in the additive container 7, the laundry can be loaded in the drum 50.

During a washing or rinsing process, water can be loaded into the tub 30, in such a way that it enters the drum 50 through its perforated lateral surface 50c; the additive pump 13 draws the washing and/or rinsing additive 8 out of the additive container 7, and pumps it out of the lifter 500, and within the drum 50, so that this washing and/or rinsing additive 8 can contact the water 3 entering the drum 50 through its perforated lateral surface 50c, and mix with such water 3 for generating a solution 14 of water 3 and washing and/or rinsing additive 8.

In this way, such solution 14 directly contacts the laundry contained in the drum 50, effectively wetting the latter, and ensuring an optimal washing and/or rinsing effect.

The functioning of the embodiment illustrated in FIG. 10 differs from the one of FIG. 9 only because in the embodiment of FIG. 10 the additive pump 13 pumps the washing and/or rinsing additive 8 within the lifter 500, which are perforated; the water present in the tub 30 enters the lifter 500 through its perforated walls, mixes with the washing and/or rinsing additive 8, and forms a solution 14 that exits the lifter 500 and goes to the internal of the drum 50 through the perforated walls of the lifter 500.

With reference to the embodiment of FIGS. 11, 12 and 13, after a washing and/or rinsing pod 17 has been loaded in the additive container 7 (FIG. 11), the laundry can be loaded in the drum 50.

During a washing or rinsing process, water can be loaded into the tub 30, in such a way that it enters the drum 50 through its perforated lateral surface 50c.

Electric actuator 18 can be actuated for moving the piercing element 19 towards the additive pod 17, until piercing this additive pod 17 (FIG. 12).

The washing and/or rinsing agent 8 exist the pod 17, and mixes with water 3 contained in the tub 30, which enters the drum 50 through its perforated lateral surface 50c, and the additive container 7 through the perforated inlet wall(s) 15 of the latter. Water and washing and/or rinsing agent produce a washing and/or rinsing solution 14 that exits the additive container through the perforated outlet wall(s) 16, and directly contacts the laundry contained in the drum 50, effectively wetting the latter, and ensuring an optimal washing and/or rinsing effect.

The functioning of the embodiment illustrated in FIG. 14 differs from the one of FIGS. 11-13 only because in the embodiment of FIG. 14 the pod 17 is pierced using an electric water jet generator 21.

It is seen therefore how the invention achieves the proposed aim and objects, there being provided a laundry washing machine which, by generating the solution of water and washing and/or rinsing additive directly within the drum, and therefore exactly where the laundry is positioned, ensures that all the laundry, or most of it, is effectively treated with the solution of water and washing and/or rinsing additive.

In addition, since the solution of water and washing and/or rinsing additive is generated directly within the drum, it is no more necessary producing a high amount of such a solution (since it is no more requires to fill conduits and/or the bottom of the tub with such a solution, like in cited prior art), and therefore the consumption of washing/rinsing additives is reduced.

In addition, generating the solution directly within the drum guarantees that the washing/rinsing effect of the washing/rinsing additive contained in such a solution is not reduced before reaching the laundry.

In addition, the inventive solution does not require providing an additive housing associated to the casing, and therefore, with respect to the known prior art, there is more free space within the cabinet of the washing machine, which could be used, for example, for increasing the load capacity of the machine.

In the advantageous embodiment in which the electric additive treating device is electrically powered by a wireless power receiver unit mounted in/on the drum, and to which the electric power is wireless transmitted by a power transmitter unit associated to the cabinet and/or to the tub, separately from the drum, it is also possible avoiding sliding contacts (and the related wear and tear problems) for transmitting electric power between a not-rotating part of the washing machine (the cabinet or the washing tub) and the drum, and therefore the reliability of the washing machine is improved.

The invention claimed is:

1. A front-loading laundry washing machine comprising:
a cabinet;
a washing tub housed inside the cabinet;
a drum rotatably housed inside the washing tub; and
an electric additive treating device mounted in or on the drum and configured for treating a washing and/or rinsing additive loaded within the drum in such a way to generate within the drum a solution of the washing and/or rinsing additive and water, the electric additive treating device including an additive container housed within the drum and adapted to be filled with a washing and/or rinsing additive, and an electric apparatus configured for causing and/or enhancing the mixing of water with the washing and/or rinsing additive, the electric apparatus including an outlet pump configured for pumping a solution of water and washing and/or rinsing additive from inside the additive container to outside the additive container,
wherein the drum comprises a plurality of lifters protruding radially inwardly from a lateral internal surface of the drum, wherein at least one of the plurality of lifters is a hollow lifter, and wherein at least one of the additive container and the electric apparatus is at least partially housed within the hollow lifter.

2. The front-loading laundry washing machine according to claim 1, wherein the electric apparatus comprises an inlet pump configured for pumping water within the additive container, in such a way that the water contacts and mixes with a washing and/or rinsing additive when the latter is contained in the additive container.

3. The front-loading laundry washing machine according to claim 2, wherein the inlet pump is configured for drawing water contained in the washing tub and pumping the water within the additive container.

4. The front-loading laundry washing machine according to claim 2, wherein the inlet pump is configured for drawing water from a water reservoir mounted in or on the drum and pumping the water within the additive container.

5. The front-loading laundry washing machine according to claim 1, wherein the additive container comprises one or more perforated inlet walls through which a liquid can enter or exit the additive container.

6. The front-loading laundry washing machine according to claim 1, wherein the electric apparatus comprises an electric mixer configured for mixing of water and washing and/or rinsing additive contained in the additive container.

7. The front-loading laundry washing machine according to claim 1, wherein the electric apparatus comprises an additive pump configured for drawing a washing and/or rinsing additive out of the additive container, and pumping it in a region of the front-loading laundry washing machine where it can contact and mix with water.

8. The front-loading laundry washing machine according to claim 1, wherein the additive container is configured for containing a washing and/or rinsing additive pod, and wherein the electric apparatus comprises an electric perforating device configured for piercing the additive pod in such a way that washing and/or rinsing additive contained therein leaks out and can mix with water contained in the additive container.

9. The front-loading laundry washing machine according to claim 8, wherein the electric perforating device comprises:
- an electric actuator configured for selectively moving a piercing element towards an additive pod contained in the additive container, until piercing the additive pod; or
- an electric water jet generator configured for selectively generating a water jet impinging on an additive pod contained in the additive container, in such a way to pierce the additive pod.

10. The front-loading laundry washing machine according to claim 1, wherein the hollow lifter comprises a lid or door allowing the access to the electric additive treating device or to a portion thereof.

11. The front-loading laundry washing machine according to claim 1, further comprising:
- a wireless power transmitter unit associated to the cabinet and/or to the washing tub separately from the drum, and arranged for wireless transmitting electric power to a wireless power receiver unit mounted in/on the drum, wherein the wireless power receiver unit is configured for supplying electric power to the electric additive treating device.

12. The front-loading laundry washing machine according to claim 11, wherein the wireless power transmitter unit is mounted in or on the washing tub.

13. The front-loading laundry washing machine according to claim 12, wherein the wireless power transmitter unit and the wireless power receiver unit are positioned, one opposite to the other, fixed respectively to the washing tub and to the drum, parallel one another, and to a plane perpendicular to a rotation axis of the drum.

14. The front-loading laundry washing machine according to claim 1, wherein the electric apparatus is controlled by a dedicated control system mounted in or on the drum.

15. The front-loading laundry washing machine according to claim 14, wherein the front-loading laundry washing machine comprises a control unit configured to manage operations of the front-loading laundry washing machine, and wherein the dedicated control system is operatively connected to and controlled by the control unit.

16. The front-loading laundry washing machine according to claim 3, wherein:
- the front-loading laundry washing machine comprises a control unit configured to manage operations of the front-loading laundry washing machine;
- a suction side of the inlet pump is fluidly connected by a suction pipe to an internal of the washing tub; and
- the control unit is configured to activate the inlet pump when an angular position of the drum is such that the suction pipe is in contact with water contained in the washing tub.

17. The front-loading laundry washing machine according to claim 1, wherein the additive container is manually and/or automatic refillable.

* * * * *